United States Patent [19]
Heidt et al.

[11] Patent Number: 5,289,131
[45] Date of Patent: Feb. 22, 1994

[54] CIRCUIT CONFIGURATION FOR MONITORING AN ELECTROMAGNETICALLY ACTUATED DEVICE, IN PARTICULAR AN ELECTROMAGNETIC CLUTCH

[75] Inventors: Heinrich Heidt, Neckarsteinach; Ulf Delang, Leimen, both of Fed. Rep. of Germany

[73] Assignee: Heidelberger Druckmaschinen AG, Heidelberg, Fed. Rep. of Germany

[21] Appl. No.: 943,395

[22] Filed: Sep. 10, 1992

[30] Foreign Application Priority Data

Sep. 10, 1991 [DE] Fed. Rep. of Germany ....... 4130041
Aug. 20, 1992 [DE] Fed. Rep. of Germany ....... 4227535

[51] Int. Cl.$^5$ ............................................. G01R 31/02
[52] U.S. Cl. .................................... 324/415; 340/644
[58] Field of Search ............... 324/415, 418, 424, 546, 324/547, 545, 653, 656; 340/644

[56] References Cited

U.S. PATENT DOCUMENTS 4,467,272  8/1984  Hassler et al. .
4,990,854  2/1991  Fritz ......................... 324/418

FOREIGN PATENT DOCUMENTS 1733458  7/1962  Fed. Rep. of Germany .
1153574  8/1963  Fed. Rep. of Germany .
3326605  2/1985  Fed. Rep. of Germany .

Primary Examiner—Walter E. Snow
Attorney, Agent, or Firm—Herbert L. Lerner; Laurence A. Greenberg

[57] ABSTRACT

A circuit configuration is provided for monitoring an electromagnetically actuated device, such as an electromagnetic clutch. The circuit comprises a switchable power source connected to the winding of the electromagnet; the power source supplies a composite voltage formed of a direct voltage part and a periodic alternating voltage part superimposed on one another. Engage and disengage signals are issued for the clutch and the direct voltage part assumes distinctly different levels in dependence on the engage and disengage signals. A precision resistor is connected in series with the winding of the electromagnet and a voltage sensor is connected at a node between the winding and the precision resistor. An evaluation circuit is connected to the voltage sensor for evaluating the alternating voltage part acting on the precision resistor and receiving therefrom information regarding the functionality of the electromagnetic device.

11 Claims, 6 Drawing Sheets

CIRCUIT CONFIGURATION FOR MONITORING AN ELECTROMAGNETICALLY ACTUATED DEVICE, IN PARTICULAR AN ELECTROMAGNETIC CLUTCH

BACKGROUND OF THE INVENTION

Field of the Invention

The invention relates primarily to a monitoring circuit for an electromagnetic clutch with regard to engaged and disengaged states thereof. The invention may furthermore be utilized in related electromagnetically actuated devices, such as control elements, servo-actuators, brakes, valves, and the like.

With machines, particularly with printing presses having complex, electrical and electronic controls, respectively, it may be necessary to obtain switching signals which provide information regarding the engaged and disengaged states of an electromagnetically operated clutch. Various possible solutions have become known heretofore for this purpose. One heretofore proposed solution calls for monitoring the position of that part of the clutch which is moved as a result of the respective engagement and disengagement. In the disengaged state, that part assumes a first position and, after a voltage has been injected in the electromagnet provided for the operation of the clutch, that part assumes a second position. The distance covered by that part from the disengaged to the engaged state is of the order of magnitude of some tenths of a millimeter to a few millimeters and can be measured with conventional position sensors, preferably of electromechanical, optoelectronic, inductive or capacitive types. In the simplest case, a microswitch may be installed permanently on the frame, and may be actuated when the clutch is in the properly and precisely engaged state.

German Published Document 31 30 259 A1 discloses a circuit configuration for a power-shift transmission wherein hydraulically operated disconnect-type clutches are provided, a displacement- or pressure-measuring system being installed in order to determine the position of the clutch. Furthermore, this circuit configuration is provided with tachometers on the input and output sides, the tachometers being connected to a control unit including a rotational-speed control loop.

A further heretofore proposed solution calls for installing a device for displacement or angle measurement as an indicator of the engaged state of a clutch, this measurement device being associated with the machine part driven by the clutch. A transmission of signals from the displacement- and angle-measuring devices, respectively, can be taken as an indication that the clutch is engage.

A disadvantage of these heretofore proposed solutions is that they each require additional, costly devices for measuring displacement, angle and rotational speed, respectively, which require additional installation space, are complicated to install and, because of their manner of construction and their complexity, adversely affect reliability with regard to the monitoring of an electromagnetic clutch. Moreover, with such proposed solutions, which are partly realized or implemented with mechanical means, one must expect that, during rough machine operation, the accuracy with which the position of the moved clutch and machine parts is determined will be lost due to mechanical and other ambient influences.

With some machines, particularly with printing presses, it may be necessary, in addition to monitoring the engaged and disengaged states, also to monitor the precise angular position of the connecting or coupling parts of a rotating clutch. In the case of toothed clutches, for example, it is possible that, during engagement and as a result of operational disturbances, respectively, the teeth may not be seated in the mating numbers provided therefor, or that the teeth do not lock in position precisely and sit in an undefined position on the side of a tooth.

Monitoring devices required for this purpose are likewise disposed as additional components on the clutch and on the driving and/or driven machine elements, respectively, and have the same disadvantages as described heretofore.

In the case of simple monitoring arrangements for an electromagnetically operated clutch, it is possible, by measuring the DC-current consumption of the electromagnet, to obtain a signal for the "clutch engaged" state. Thus, it is possible, for example, in the connection or terminal line to the electromagnet, to connect an ohmic resistance in series with the electromagnet, the voltage drop across the resistance being evaluated. If the voltage drop exceeds a given threshold value, it is possible then, at the output of a comparator connected to the resistance, to provide a signal pulse edge or slope which can be taken as an indication that the clutch is in the engaged state.

With this heretofore proposed solution, it is assumed that, when in electromagnetic clutch is supplied with voltage and current, respectively, it assumes its intended position, i.e. a toothed clutch, for example, locks precisely in place with respect to the axial position and angular position of the machine elements which are to be coupled. A disadvantage thereof is that, due to the measurement of the DC-current susceptibility or consumption of the electromagnet, it is not possible to detect minor deviations from the precisely engaged state, because there is only an insignificant change in the DC current due to the saturation of the electromagnet in these ranges.

It is accordingly an object of the invention to provide a circuit configuration for monitoring an electromagnetically actuated clutch which permits at low cost and with relatively little outlay of materials, a reliable monitoring of the engaged and disengaged states of the clutch and of the angular position of the connecting or coupling machine elements.

With the foregoing and other objects in view there is provided, in accordance with the invention, a circuit configuration for monitoring an electromagnetically actuated device, such as an electromagnetic clutch, having an electromagnet with a winding, comprising a switchable power source connected to the winding of the electromagnet, the power source being means for supplying a voltage formed of a direct voltage part and a periodic alternating voltage part superimposed on the direct voltage part, means for issuing engage and disengage signals for the device and for providing the direct voltage part at two defined levels in dependence on the engage and disengage signals, a precision resistor connected in series with the winding of the electromagnet, a voltage sensor connected at a node between the winding and the precision resistor, and an evaluation circuit connected to the voltage sensor for evaluating the alternating voltage part acting on the precision resistor.

In accordance with an added feature of the invention, circuit configuration includes an alternating voltage source supplying the alternating voltage part with a given period of oscillation to the power source, the voltage sensor being an alternating voltage amplifier, and the evaluation circuit including a comparator having first and second inputs and an output, the first input being connected to an output of the alternating voltage amplifier, a reference voltage source connected to the second input, the reference voltage source providing two defined reference voltage levels in dependence on the engage and disengage signals, a flip flop having a set input connected to the output of the comparator and a reset input connected to the alternating voltage source, a one-shot connected with an output of the flip flop and having an ON-time greater than the given period of oscillation, and an exclusive-NOR member connected with an output of the one-shot, the exclusive-NOR member having an input connected to the issuing means for receiving the engage and disengage signals.

In accordance with an additional feature of the invention, the means for issuing the engage and disengage signals are a switch by which the device is turned on or off.

In accordance with a further feature of the invention, the voltage sensor is a direct voltage amplifier, and the evaluation circuit includes an alternating voltage amplifier connected downstream of the direct voltage amplifier, a rectifier circuit connected downstream of the alternating voltage amplifier, two sample-and-hold circuits connected downstream of the rectifier circuit, the sample-and-hold circuits having pulse inputs, first and second pulse forming circuit means respectively connected between the alternating voltage source and the respective pulse inputs of the sample-and-hold circuits, an adder connected downstream of the sample-and-hold circuits, and a voltage measurement circuit connected to an output of the adder.

In accordance with another feature of the invention, the first pulse forming circuit includes a high-pass and a non-inverting Schmitt-trigger, and the second pulse forming circuit includes a high-pass and an inverting Schmitt-trigger.

In accordance with yet another feature of the invention, the voltage measurement circuit includes a comparator having a first input connected with an output of the adder, and a voltage divider connecting a second input of the comparator to the direct voltage source.

In accordance with yet an additional feature of the invention, the circuit configuration includes an AND-member having a first input connected to an output of the comparator and a second input, and a window comparator having an output connected to the second input of the comparator.

With the objects of the invention in view there is also provided, in accordance with added features of the invention, a circuit configuration for monitoring an electromagnetic device, such as a clutch, having an electromagnet with a winding, comprising:

direct voltage means for supplying a direct voltage at two distinctly different voltage levels;

alternating voltage means for supplying a periodically alternating voltage with a given period of oscillation;

power source means for superimposing the direct and alternating voltages on one another for forming a composite voltage having a direct voltage part and an alternating voltage part, and for switching the direct voltage part to a relatively low level upon issuance of a disengage signal for the device, and for switching the direct voltage part to a relatively higher level upon issuance of an engage signal for the device;

the power source means injecting a voltage in the winding of the electromagnet independently of the engage or disengage signals;

voltage evaluation circuit means connected to the winding of the electromagnet for evaluating a voltage at the winding and determining a state of the electromagnetically actuated device.

In accordance with a concomitant feature of the invention, the voltage evaluation circuit means include voltage sensor means in the form of an alternating voltage amplifier, a comparator having a first input connected to an output of the alternating voltage amplifier, a reference voltage source connected to a second input of the comparator, the reference voltage source providing two defined reference voltage levels in dependence o the engage and disengage signals, a flip flop having a set input connected to an output of the comparator and a reset input connected to the alternating voltage means, a one-shot connected with an output of the flip flop and having an ON-time greater than the given period of oscillation, and an exclusive-NOR gate connected with an output of the one-shot and with the means for issuing the engage and disengage signals.

Other features which are considered as characteristic for the invention are set forth in the appended claims.

According to the invention a periodic alternating current is superimposed on the trigger current of the electromagnetic device, for example of the magnetic clutch. The voltage drop of the alternating voltage across a resistance which is connected in series with the winding is evaluated in a circuit configuration for a signal for monitoring the engaged and disengaged states of the electromagnetic device.

It is advantageous in the signal evaluation, if a periodic rectangular pulse train signal with a duty cycle ratio of greater or equal 50% is used in the superposition.

Although the invention is illustrated and described herein as embodied in a circuit configuration for monitoring an electromagnetically actuated device, in particular an electromagnetic clutch, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
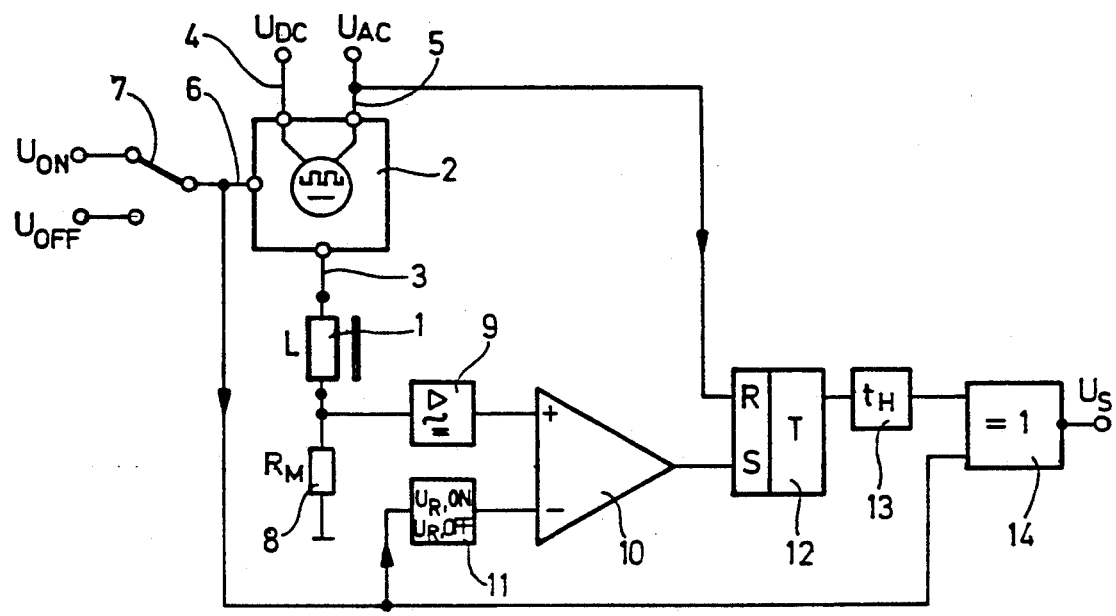
FIG. 1 is a block diagram of a first embodiment of the circuit configuration according to the invention.

Referring now to the figures of the drawing in detail and first, particularly, to FIG. 1 thereof, there is seen a circuit in which a winding 1 of an electromagnetically actuated clutch is shown. One end of the winding 1 is connected to a power source 2. A direct voltage on which there is superimposed a periodic rectangular pulse train issues at an output 3 of the power source 2. The effective value of the direct voltage in a first case drives the current required for engaging the clutch through the winding 1. In a second case, for the disengaged condition, the direct voltage component at the output 3 is so small that the electromagnet effectively does not actuate the clutch.

The power source 2 has inputs 4 and 5, into which there are injected a direct voltage $U_{DC}$ and a periodic rectangular pulse train $U_{AC}$, respectively. The signals are combined in the power source 2, in which the alternating voltage and the direct voltage are superimposed on one another. The value for the direct voltage component at the output 3 depends on a signal level at a further input 6 of the power source 2 and, by way of example, corresponds to the rated voltage of the clutch, e.g. 24 V, in its engaged condition. A switch 7 connects to a control voltage $U_{ON}$ for that purpose. In the disengaged condition, the switch 7 connects to a control voltage $U_{OFF}$, so that the direct voltage component at the output 3 is only a few volts, for example 2 V.

The other end of the winding 1 is connected to ground through a precision resistor 8, which is also connected to an input of a pure a.c. voltage amplifier 9. The voltage amplifier 9 amplifies only the alternating voltage component which drops across the precision resistor 8. An output of the a.c. voltage amplifier 9 is connected with a first input of a comparator 10. The signal levels present through the switch 7 at the input 6 for the engaged and disengaged conditions, are also present at the input of a reference voltage source 11.

When the switch 7 connects to $U_{ON}$, the reference voltage source 11 provides a reference volta $U_{R,ON}$ at the second input of the comparator 10. When the switch 7 connects to $U_{OFF}$, the reference voltage source 11 provides a reference voltage $U_{R,OFF}$ at the second input of the comparator 10. The output of the comparator 10 is connected to the set input of a flip flop 12. The reset input of the flip flop 12 is connected to the a.c. source which provides the periodic rectangular pulse train $U_{AC}$. The output of the flip flop 12 is connected to a one-shot or monoflop 13, the holding period or ON-time $t_H$ of which is greater than the period of oscillation of the rectangular pulse train $U_{AC}$. The output signal of the one-shot 13 is supplied to an exclusive-NOR member 14 which, through another control input receives a control signal level from the switch 7 for engaging or disengaging. Depending on the position of the switch 7, the level present at the signal input of the exclusive-NOR gate 14 is either inverted or not inverted.

Figure 2:
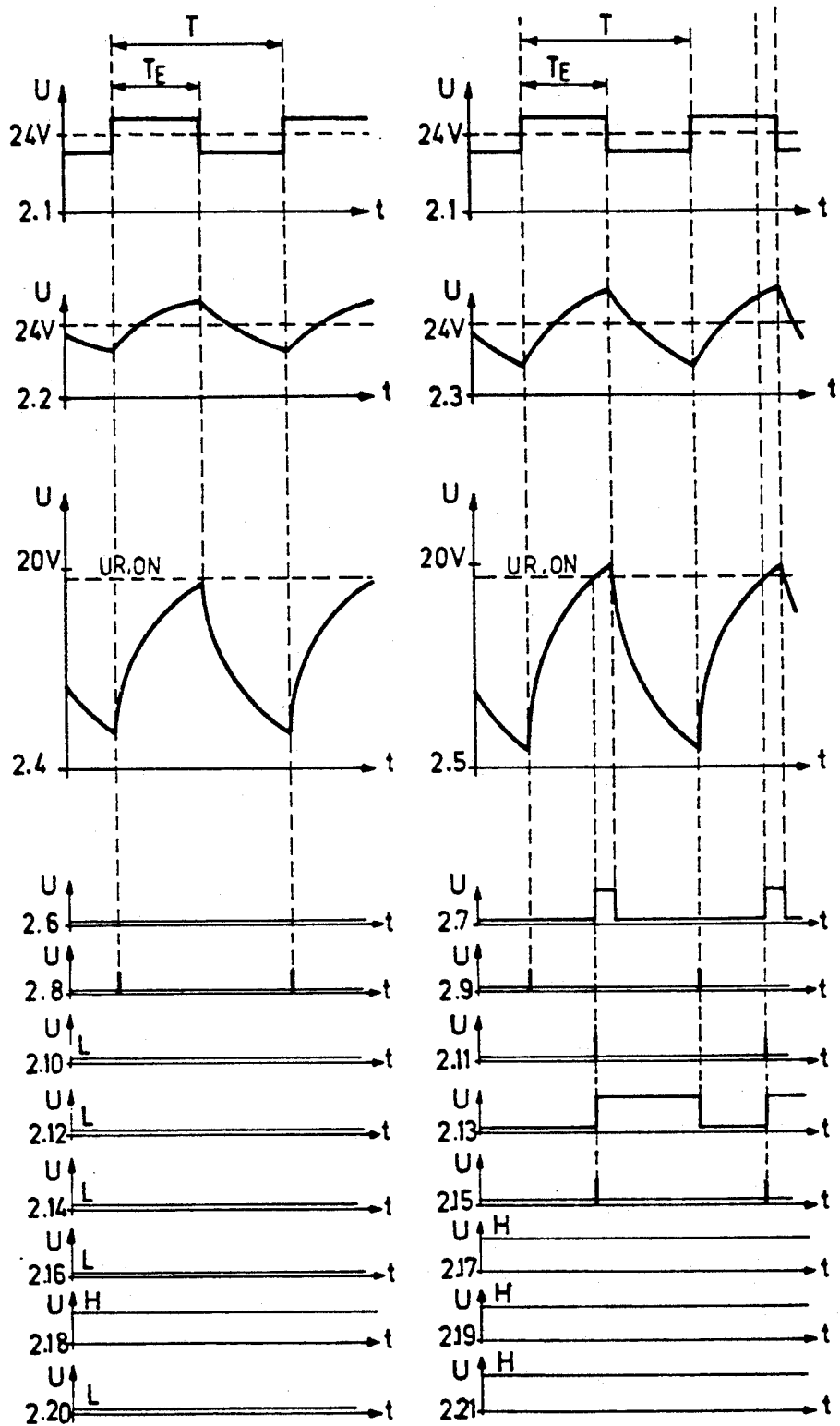
FIGS. 2 and 3 are pulse diagrams for monitoring the engaged and disengaged states of a clutch in the circuit embodiment of FIG. 1.
Figure 3:
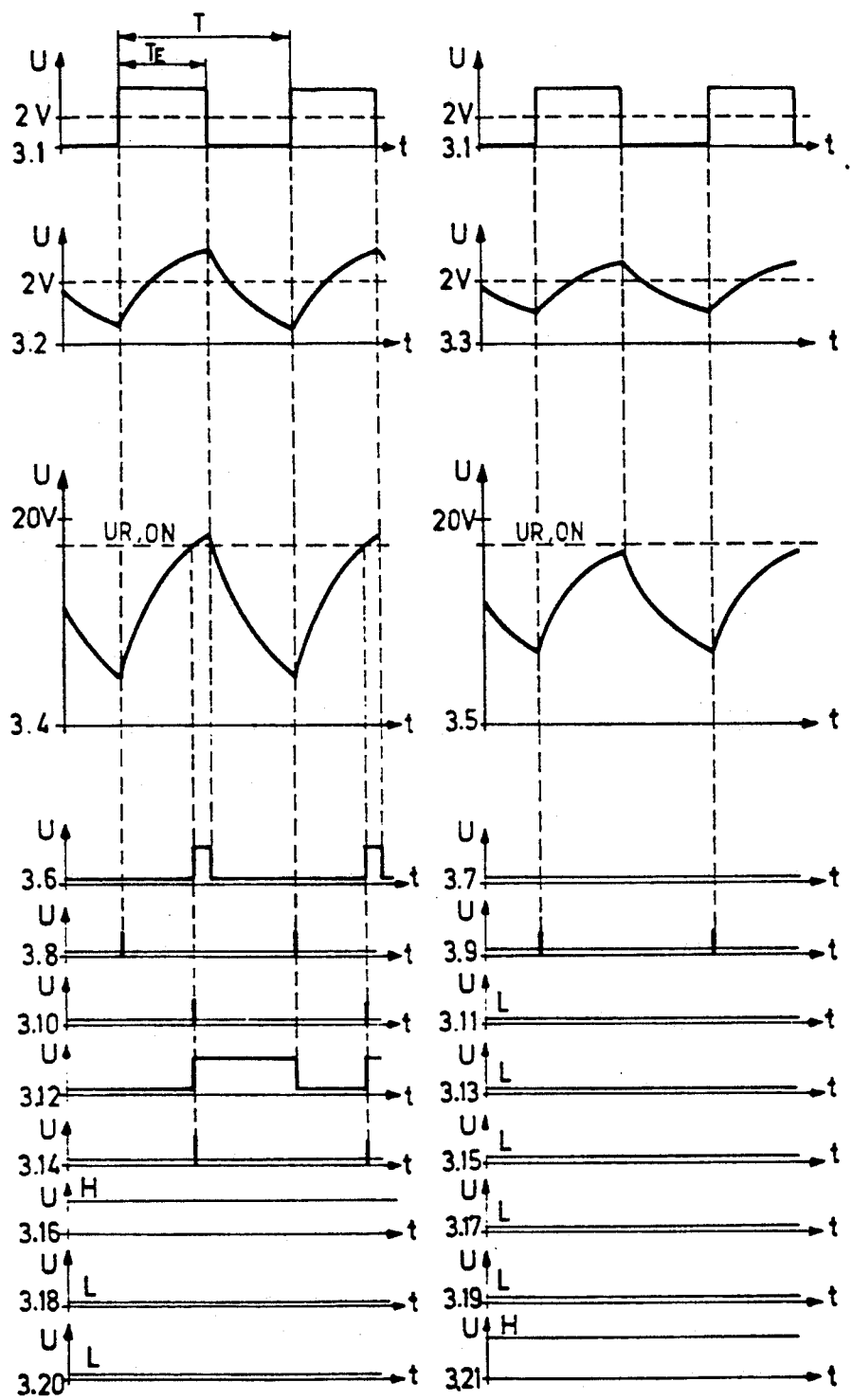

The operation of the circuit configuration of FIG. 1 is best explained with the aid of the pulse diagrams shown in FIGS. 2 and 3:

When the clutch is to engage, the switch 7 is connected to the voltage level $U_{ON}$, so that the power source 2 provides a composite or mixed voltage with a direct voltage component $U_{DC}$ and an alternating voltage component $U_{AC}$ at its output 3. The composite voltage is depicted in the diagram 2.1, whereby its effective value is high enough so as to provide enough force in the winding of the electromagnet to engage the clutch. The alternating voltage on the precision resistor 8 is depicted in the diagram 2.2 for the case when the clutch is not properly engaged. The diagram 2.3 shows the alternating voltage for the properly engaged clutch. The alternating voltages for these two cases are distinguished by their respective rates of rise or rise times for the monotonously rising part of the alternating voltages. The difference is caused by the fact that, due to the enlarged air gap which occurs in the improperly engaged state, the inductivity L of the winding 1 is smaller. The change in the inductivity L of the winding 1 is primarily due to the linearization of the characteristic magnetic curve which is effected by the change in the air gap. The diagrams 2.4 and 2.5 show the amplified alternating voltages at the output of the amplifier 9. The reference potential $U_{R,ON}$ provided by the reference voltage source 11 is indicated with dashed lines. As can be seen in the diagram 2.5, only in the case of a properly engaged clutch does the alternating voltage cross the comparator threshold $U_{R,ON}$, i.e. only in this case is the comparator 10 triggered. This can be seen in the diagrams 2.6 and 2.7. As shown in the diagrams 2.8 and 2.9, the rise edges of the rectangular pulse train $U_{AC}$ cause the flip flop 12 to be reset. Setting of the flip flop 12 is effected by the rise edges at the output of the comparator 10. The set signals are illustrated in the diagrams 2.10 and 2.11, and the output signals of the flip flop 12 are illustrated in the diagrams 2.12 and 2.13. The rise edges at the output of the flip flop 12, as they are shown in the diagrams 2.14 and 2.15, cause the retriggerable one-shot 13 to trigger, whereby the ON-time $t_H$ is greater than the period T of the rectangular pulse train $U_{AC}$. The one-shot 13 is therefore triggered during the ON-time $t_H$ by the rise edges at the output of the flip flop 12, so that a constant logic H-level is present in the case of an engaged clutch. This is depicted in the diagram 2.17.

Since the signal level $U_{ON}$, through the switch 7, places a logic H-level on the second input of the exclusive-NOR member 14 (diagrams 2.18 and 2.19), the H-level from the one-shot 13 is also present at the output of the exclusive-NOR member 14. From there it is available for further processing in the machine or for providing a status indication. In the not exactly engaged state the comparator 10 is not triggered, so that the flip flop 12 is not set. Correspondingly, the output of the one-shot 13 and the output of the exclusive-NOR member 14 remain at the logic L-level, as shown in the diagrams 2.16 and 2.20.

FIG. 3 illustrates the diagrams for the case in which the clutch is not to be engaged. Analogously to the cases of proper and improper engagement, the diagrams 3.1, 3.2, 3.4, 3.6, etc. illustrate the properly disengaged state of the clutch, while the diagrams 3.1, 3.3, 3.5, 3.7, etc. refer to the improperly disengaged state of the clutch.

The difference with regard to the case in FIG. 2 is that the winding 3 is supplied with a mixed voltage whose effective value is only a few volts, for example 2 V (diagram 3.2). Furthermore, the reference voltage source 11 and the exclusive-NOR member 14 are connected to a logic L-level, so that the reference voltage source 11 provides the threshold value $U_{R,OFF}$ for the comparator 10 and the H-level appears at the output of the exclusive-NOR member 14 when the clutch is still engaged. When the clutch is not turned on, the output voltage of the alternating voltage amplifier 9 exceeds the comparator threshold $U_{R,OFF}$ only when the clutch is properly disengaged, as it is depicted in FIG. 3.4.

The duty cycle ratio $T_E/T$ and the frequency of the periodic rectangular pulse train $U_{AC}$ are preferably chosen such that the amplitudes of the alternating voltages a the alternating voltage amplifier 9 are as different as possible for the engaged state and for the disengaged state.

Figure 4:
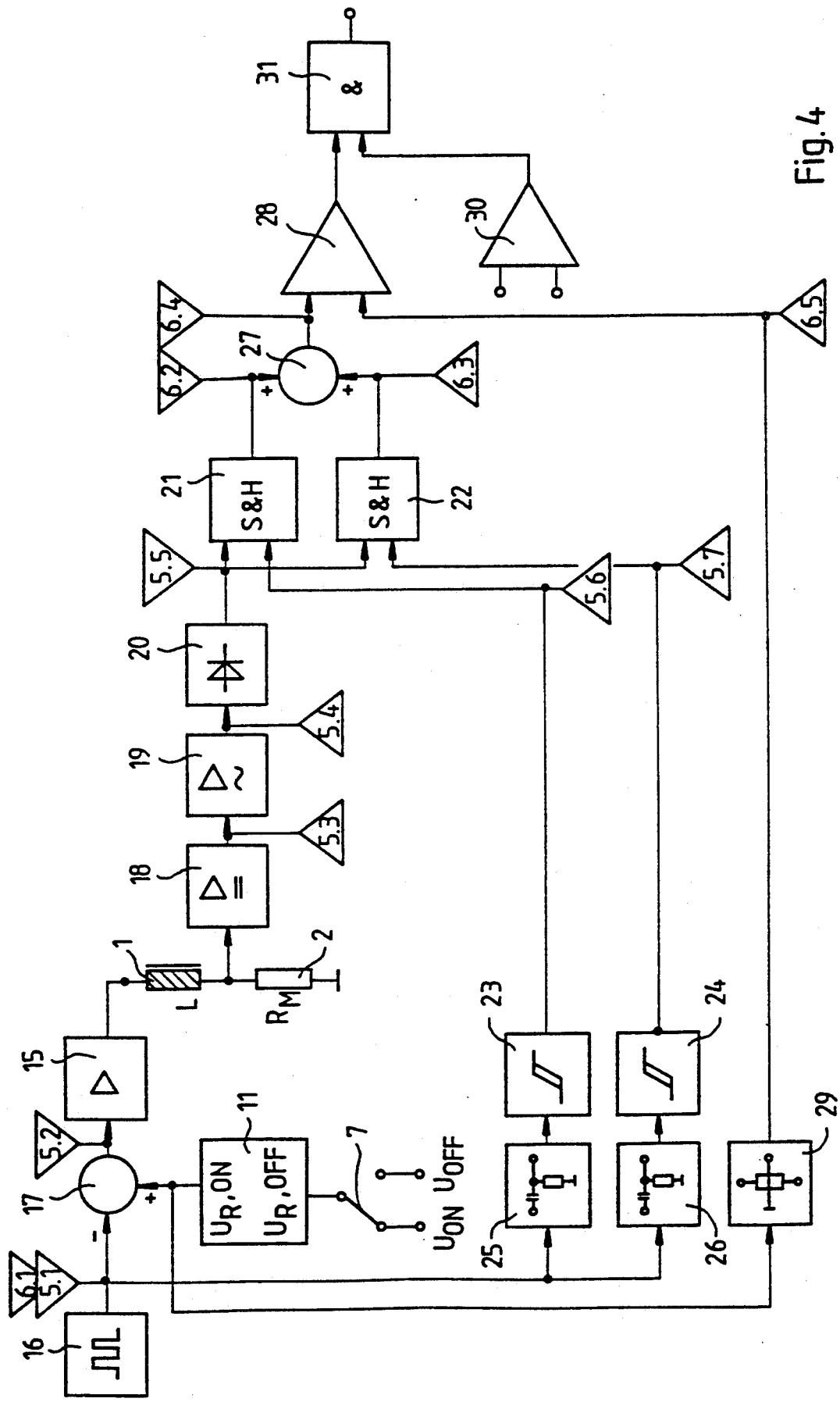
FIG. 4 is a block diagram of a further embodiment of the invention.

In the embodiment shown in FIG. 4, the winding 1 of the clutch is also injected with a direct voltage, through a power stage 15. An alternating voltage is superimposed on the direct voltage. The alternating voltage is produced in an oscillator 16, the periodic rectangular train pulse of which is fed to a first input of a subtractor 17. The other input of the subtractor 17 is supplied with a direct current which, depending on the turn-on or turn-off state of the clutch, is the voltage $U_{R,ON}$ or the voltage $U_{R,OFF}$, respectively. The signal issuing from the output of the subtractor 17 is amplified in a power stage 15. A direct voltage amplifier 18, followed by an alternating voltage amplifier 19, is connected at a node between the precision resistor 2 and the clutch winding. The amplified alternating voltage at the output of the amplifier 19 is rectified in a rectifier circuit 20, the output of which is connected to the inputs of two sample-and-hold circuits 21, 22. The pulse input of the sample-and-hold circuit 21 is connected with an output of a non-inverting Schmitt-trigger 23, and the pulse input of the sample-and-hold circuit 22 is connected with an output of an inverting comparator 24. High-pass filters 25 and 26 are connected upstream of each of the comparators 23 and 24. The inputs of the high-pass filters 25, 26 are connected to the output of the oscillator 16. The output signals of the sample-and-hold circuits 21, 22 are fed to an adder 27, the output of which is connected to a first input of a comparator 28. The second input of the comparator 28 is connected to the reference voltage source 11 through a voltage divider 29. The output signals from the comparator 28, as well as those of a window comparator 30, are supplied to the inputs of an AND-member 31. A window comparator, it is noted, is one which is used to determine whether or not the value of the input voltage lies between two reference voltage levels. The output signal of the AND-member provides information regarding the state of the electromagnetically operated clutch.

Figure 5:
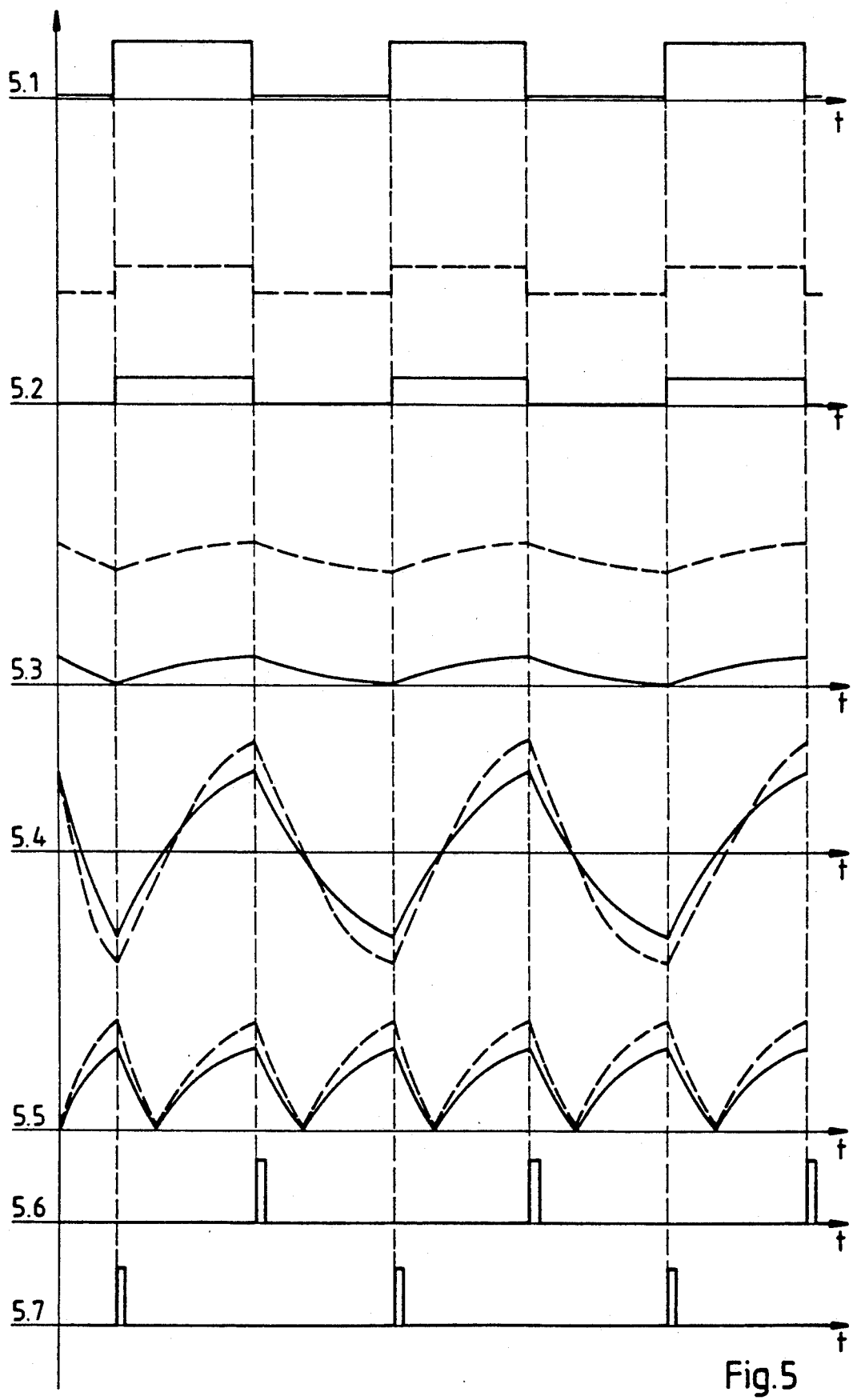
FIGS 5 and 6 are pulse diagrams similar to those of FIGS. 2 and 3, as relating to the embodiment of FIG. 4.
Figure 6:
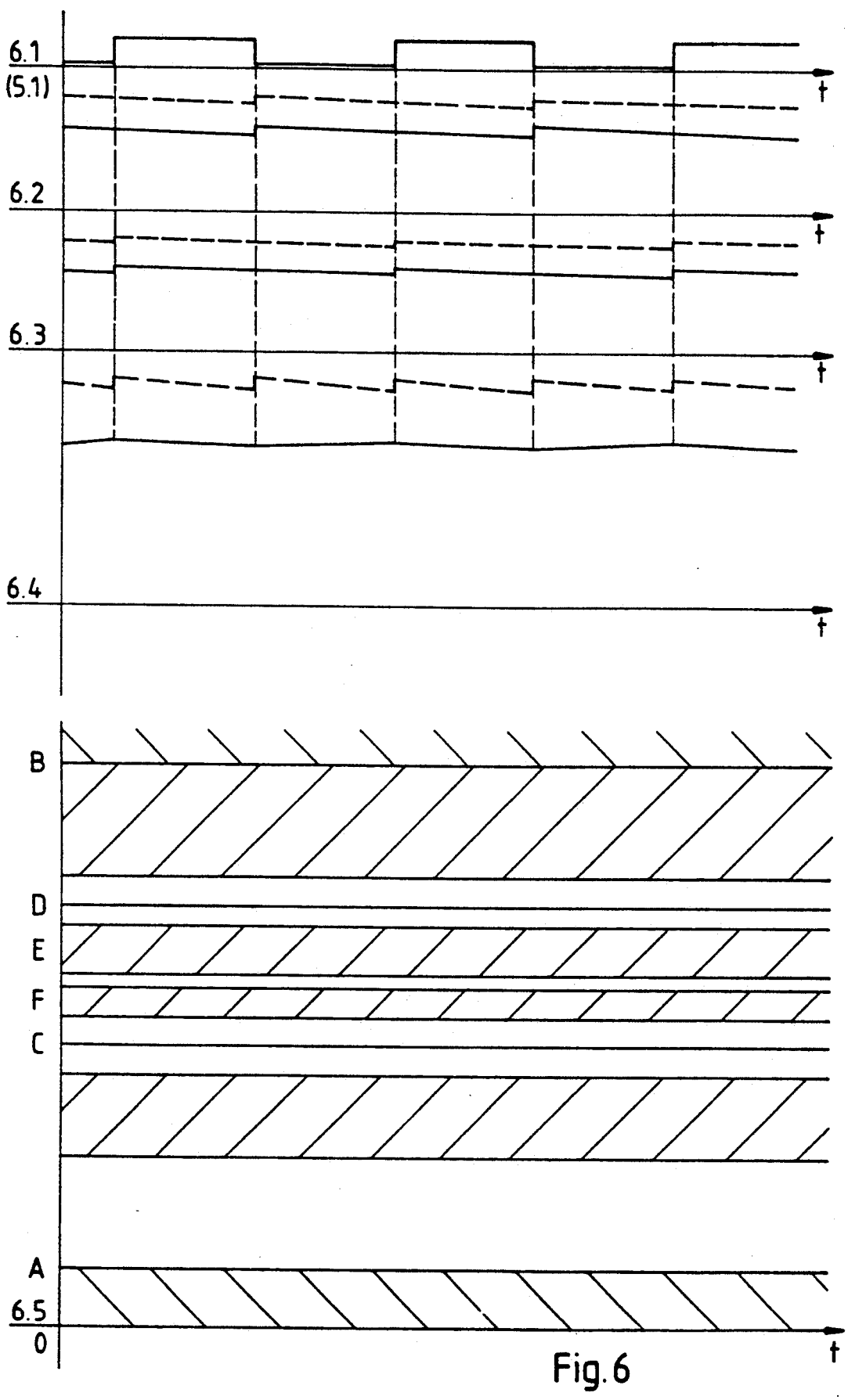

FIGS. 5 and 6 illustrate the pulse diagrams with regard to the circuit configuration of FIG. 4:

The dashed lines refer to pulse curves in the switched-on state of the clutch. The alternating currents shown in the diagram 5.4 need not necessarily be symmetric relative to the zero line.

The sample-and-hold circuits 21, 22 act as peak value detectors for the signal provided at the output of the rectifier circuit 20 (diagram 5.5) with a hold time which corresponds to the period of the rectangular pulse train shown in the diagram 5.1. The sample pulses according to diagrams 5.6 and 5.7 are phase-displaced by 180° relative to one another, because they are deduced directly from the rectangular pulse train (diagram 5.1) through the high passes 25, 26 and the comparators 23, 24. The two stored peak values according to diagrams 6.2 and 6.3 are summed in the adder 27, so that the output of the adder 27 provides the peak-peak value of the alternating voltage according to diagram 5.4. The level of this peak-peak value is continuously analyzed by means of the comparator 28, the window comparator 30 and the AND-member 31.

Diagram 6.5 shows the level ranges for the various conditions of the clutch. The window comparator, for security reasons, provides plausibility limits A and B — which means that signal evaluation is possible only within the window region A, B. The letters C and D refer to signal levels which are produced from the reference voltage source 11 by the voltage divider 29. When the switch 7 is in the ON position, then the input of the comparator 28 receives the level D. In the OFF position, the comparator 28 receives the level C. When the output signal from the AND-member 31 lies in the shaded region between the levels B and D, then that signal indicates that the clutch is actuated and has properly engaged. When the output signal lies in the shaded range between the levels A and C, it can be determined that the clutch is not turned on and it is properly disengaged.

When the output signal lies in the region between E and F, then an error function of the clutch is indicated. An output signal in the range E indicates that the clutch is turned on, but has not properly engaged —— due, for example, to an unacceptable air gap between two clutch parts present in the magnetic field. An output signal in the region F characterizes the turned-off state of the clutch, with an air gap present between two clutch parts, so that the clutch has not properly disengaged.

The output signal of the circuit configuration can be supplied to a machine control which, for example, may issue an emergency stop accompanied by an error signal.

We claim:

1. Circuit configuration for monitoring an electromagnetically actuated device having an electromagnet with a winding, comprising a switchable power source connected to the winding of the electromagnet, the power source being means for supplying a voltage formed of a direct voltage part and a periodic alternating voltage part superimposed on the direct voltage part, means for issuing engage and disengage signals for the electromagnetic device and for providing said direct voltage part at two defined levels in dependence on said engage and disengage signals, a precision resistor connected in series with the winding of the electromagnet, a voltage sensor connected at a node between the winding and said precision resistor, and an evaluation circuit connected to said voltage sensor for evaluating the alternating voltage part acting on said precision resistor.

2. The circuit configuration according to claim 1, including an alternating voltage source supplying said alternating voltage part with a given period of oscillation to said power source, said voltage sensor being an alternating voltage amplifier, and said evaluation circuit including a comparator having first and second inputs and an output, said first input being connected to an output of said alternating voltage amplifier, a reference voltage source connected to said second input, said reference voltage source providing two defined reference voltage levels in dependence on the engage and disengage signals, a flip flop having a set input connected to said output of said comparator and a reset input connected to said alternating voltage source, a one-shot connected with an output of said flip flop and having an ON-time greater than said given period of oscillation, and an exclusive-NOR member connected with an output of said one-shot, said exclusive-NOR member having an input connected to said issuing means for receiving said engage and disengage signals.

3. The circuit configuration according to claim 2, wherein said issuing means are a switch.

4. The circuit configuration according to claim 1, wherein said voltage sensor is a direct voltage amplifier, and wherein said evaluation circuit includes an alternating voltage amplifier connected downstream of said direct voltage amplifier, a rectifier circuit connected downstream of said alternating voltage amplifier, two sample-and-hold circuits connected downstream of said rectifier circuit, said sample-and-hold circuits having pulse inputs, first and second pulse forming circuit means respectively connected between said alternating voltage source and said respective pulse inputs of said sample-and-hold circuits, an adder connected downstream of said sample-and-hold circuits, and a voltage measurement circuit connected to an output of said adder.

5. The circuit configuration according to claim 4, wherein said first pulse forming circuit includes a high-pass and a non-inverting Schmitt-trigger, and said second pulse forming circuit includes a high-pass and an inverting Schmitt-trigger.

6. The circuit configuration according to claim 4, wherein said voltage measurement circuit includes a comparator having a first input connected with an output of said adder, and a voltage divider connecting a second input of said comparator to said direct voltage source.

7. The circuit configuration according to claim 6, including an AND-member having a first input connected to an output of said comparator and a second input, and a window comparator having an output connected to said second input of said comparator.

8. The circuit configuration according to claim 1, wherein said electromagnetically actuated device is an electromagnetic clutch.

9. Circuit configuration for monitoring an electromagnetic device having an electromagnet with a winding, comprising direct voltage means for supplying a direct voltage at two distinctly different voltage levels;

alternating voltage means for supplying a periodically alternating voltage with a given period of oscillation;

power source means for superimposing said direct and alternating voltages on one another for forming a composite voltage having a direct voltage part and an alternating voltage part, and for switching said direct voltage part to a relatively low level upon issuance of a disengage signal for the electromagnetic device, and for switching said direct voltage part to a relatively higher level upon issuance of an engage signal for the device;

said power source means remaining connected to the winding of the electromagnet independently of said engage or disengage signals;

voltage evaluation circuit means connected to the winding of the electromagnet for evaluating a voltage at the winding and determining a state of the electromagnetic device.

10. The circuit configuration according to claim 9, wherein said voltage evaluation circuit means include voltage sensor means in the form of an alternating voltage amplifier, a comparator having a first input connected to an output of said alternating voltage amplifier, a reference voltage source connected to a second input of said comparator, said reference voltage source providing two defined reference voltage levels in dependence on said engage and disengage signals, a flip flop having a set input connected to an output of said comparator and a reset input connected to said alternating voltage means, a one-shot connected with an output of said flip flop and having an ON-time greater than said given period of oscillation, and an exclusive-NOR gate connected with an output of said one-shot and with the means for issuing said engage and disengage signals.

11. The circuit configuration according to claim 9, wherein said electromagnetically actuated device is an electromagnetic clutch.

* * * * *